(12) United States Patent
Sakai (10) Patent No.: US 7,636,932 B2
(45) Date of Patent: Dec. 22, 2009

(54) MULTICAST PROGRAM RECEPTION AT HOME GATEWAY APPARATUS

(75) Inventor: Junichi Sakai, Tokyo (JP)

(73) Assignee: Panasonic Corporation, Toyko (JP)

( * ) Notice: Subject to any disclaimer, the term of this patent is extended or adjusted under 35 U.S.C. 154(b) by 1503 days.

(21) Appl. No.: 10/270,605

(22) Filed: Oct. 16, 2002

(65) Prior Publication Data

US 2003/0106066 A1 Jun. 5, 2003

(30) Foreign Application Priority Data

Nov. 30, 2001 (JP) ............................. 2001-367680

(51) Int. Cl.
*H04N 7/18* (2006.01)
*G06F 3/00* (2006.01)
*G06F 13/00* (2006.01)

(52) U.S. Cl. .......................................... 725/82; 725/39

(58) Field of Classification Search .................... 725/82
See application file for complete search history.

(56) References Cited

U.S. PATENT DOCUMENTS

| | | | |
|---|---|---|---|
| 6,496,862 B1 | 12/2002 | Akatsu et al. | |
| 6,505,255 B1 | 1/2003 | Akatsu et al. | |
| 6,751,221 B1 * | 6/2004 | Saito et al. | 370/392 |
| 2002/0044225 A1 * | 4/2002 | Rakib | 348/734 |
| 2002/0174444 A1 * | 11/2002 | Gatto et al. | 725/133 |
| 2004/0196853 A1 | 10/2004 | Saito et al. | |
| 2005/0028206 A1 * | 2/2005 | Cameron et al. | 725/46 |

FOREIGN PATENT DOCUMENTS

| | | |
|---|---|---|
| JP | 10-308759 | 11/1998 |
| JP | 11-88279 | 3/1999 |
| JP | 11-341040 | 12/1999 |
| JP | 2000-278298 | 10/2000 |
| JP | 2000-358061 | 12/2000 |

OTHER PUBLICATIONS

English language Abstract and partial translation of JP 10-308759.
English language Abstract of JP 2000-358061.
Saito et al., "Homenetwork Architecture Considering Digital Home Appliances," The Institute of Electronics, Information and Communication Engineers, Technical Report of IEICE,, IN97-128, Nov. 1997, pp. 57-64, together with an English language Abstract and an English language partial translation thereof.
English Language Abstract of JP11-341040.
English Language Abstract of JP 2000-278298.
English Language Abstract of JP 11-88279.

* cited by examiner

*Primary Examiner*—Scott Beliveau
*Assistant Examiner*—Bennett Ingvoldstad
(74) *Attorney, Agent, or Firm*—Greenblum & Bernstein PLC (57) ABSTRACT

A home gateway apparatus receives a request for desired contents from a program selection terminal storing a program guide at a home. When an IP packet addressed to a home network from the Internet is retrieved, it is checked whether the retrieved IP packet includes the desired contents, a reception of which is being requested. When the IP packet includes the desired contents, such contents are delivered to a TV apparatus via IEEE1394 network. When the IP packet does not include such contents, the IP packet is forwarded to other destination terminals in the home network.

8 Claims, 11 Drawing Sheets

| program A | http//hgw/ch.fee:1 |
| program B | http//hgw/ch.fee:2 |
| ⋮ | ⋮ |
| terminate program | http//hgw/off.fee:1 |
| volume | http//hgw/up.fee:1 |

MULTICAST PROGRAM RECEPTION AT HOME GATEWAY APPARATUS

BACKGROUND OF THE INVENTION

1. Field of the Invention

The present invention relates to a gateway apparatus and information distribution system that can display various contents, including broadcasting contents from data center/broadcast station, on a viewer terminal via an IP network such as the Internet.

2. Description of Related Art

In recent years of a rapid spread of the broadband use in the Internet environment, such as XDSL and FTTH, a new generation of Internet services has began in which broadband services that provide rich contents, e.g., motion pictures, via Internet are utilized.

With the above background, there is an increasing need to distribute broadcasting contents to viewer terminals via an IP network. Unicast and multicast distributions are used as a video image distribution technology that distributes broadcasting contents to viewer terminals via the IP network. Unicast distribution is a video image distribution technology distributing broadcasting contents such as video images by performing a one-to-one communication between a terminal that can process communication based on an IP (hereafter referred to as "IP terminal") and server that distributes the broadcasting contents on an IP network such as the Internet. Multicast distribution is a video image distribution technology that transmits contents having multicast addresses to the IP network, while individual routers copies and forwards data to downstream routers, each router serving as a turning point at a path from the server to an IP terminal, and an IP terminal receives the data of participating multicast address.

By employing the above-described video image distribution technology, it is possible to distribute broadcasting contents to IP terminals (viewer terminals) via the IP network.

In a general home/office setting, an IP terminal that can display video images is usually a personal computer. The display provided with such a personal computer is limited in screen size, because it is primarily used on a desktop. However, a TV apparatus in a home/office tends to have a larger screen, since its primary role is to view broadcasting video images, such as motion pictures. In reality, there are many homes and offices that have large-screen TV apparatuses.

However, many TV apparatuses that are already set in homes and offices do not have a function to receive data distributed via IP network. Therefore, in reality, only personal computers can display the broadcasting contents at home.

Although attempts have been made to provide TV apparatuses with IP terminal functions, consumers is required to buy new sets without making use out of the existing TV apparatuses, thereby largely financially burdening the user.

SUMMARY OF THE INVENTION

The present invention is provided to address the above-described problems. The object of the invention is to provide a gateway apparatus and information distribution system that can display contents distributed via an IP network, on a TV apparatus that does not have an IP terminal function, and excels in operating for program selections without demanding the user of complicated operations.

The gateway apparatus of the present invention receives a reception request for desired contents from a program selection terminal at home storing a program guide (contents), retrieves an IP packet addressed to the home network from an IP network outside of home, and transmits the contents to a TV apparatus when the retrieved IP packet includes the desired contents that is requested by the reception request, or forwards the IP packet to another destination terminal in the home network when the retrieved IP packet does not include the desired contents.

According to the invention, desired contents that are selected by the user within the distributed contents in the IP network are received and transmitted to a TV apparatus. Therefore, it is possible to display the contents distributed in the IP network on a TV apparatus that does not have an IP terminal function.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 10(*a*) illustrates a configuration of an IP packet data received by the home gateway;

FIG. 10(*b*) illustrates a configuration of an IEEE1394 packet data forwarded by the home gateway.

DETAILED DESCRIPTION OF PREFERRED EMBODIMENTS

The embodiment of the video image distribution system according to the present invention is explained in the following, in reference to the above-described drawings.

Figure 1:
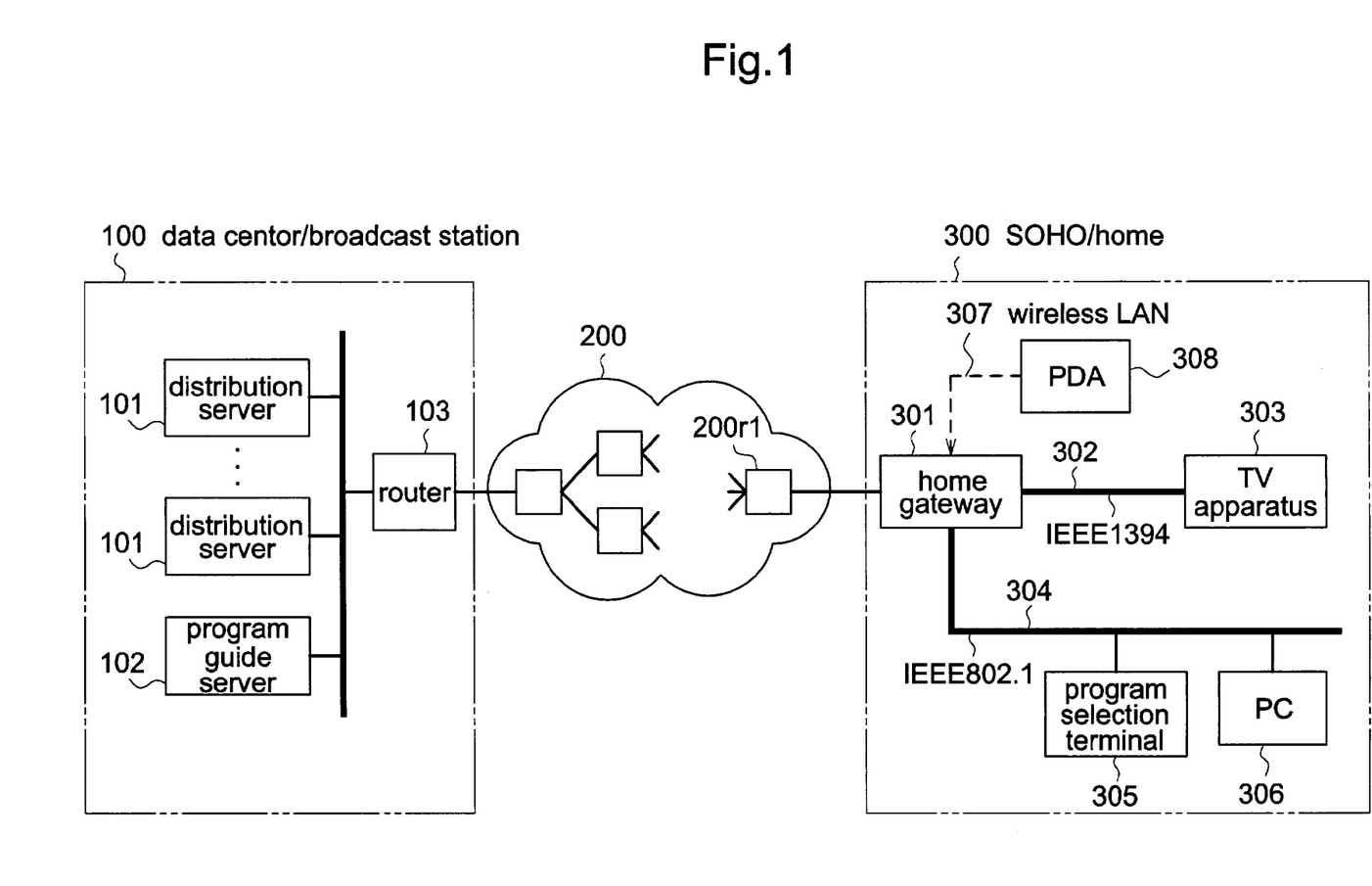
FIG. 1 illustrates a system configuration of an entire video image distribution system according to an embodiment of the present invention.

FIG. 1 illustrates a system configuration of an entire video image distribution system according to the embodiment of the present invention. FIG. 1 shows a broadcasting system in which data center/broadcast station 100 broadcasts contents (hereafter referred to as "program") to a plurality of SOHO (Small Office, Home Office)/home 300 via Internet 200. The sender of the broadcasting program is typically a broadcast station, however, it can be a data distribution center other than a broadcast station. In this embodiment, the sender is referred to as data center/broadcast station 100. The location for setting the TV apparatus to receive and display broadcasting programs can be at a home, business office, and on a street, similar to existing ground wave TV or satellite broadcasting systems. In this embodiment, it is referred to SOHO/home 300.

Data center/broadcast station 100 has distribution server 101 that distributes program video images for each program, and program guide server 102 that generates and transmits electronic program guide (hereafter referred to as "EPG"). Data center/broadcast station 100 is connected to Internet 200 via router 103. Distribution server 101 uses a multicast address assigned to its distributing program and multicasts the program video images on Internet 200. Program guide server 102 can operate as an HTTP server and transmits an EPG in response, which includes a multicast address for each program generated according to the requester, after receiving a request from program selection terminal 305.

SOHO/home 300 has home gateway 301, which is connected to Internet 200 outside of home, while being connected to the home network at home. Home gateway 301 can exchange data with TV apparatus 303 via IEEE1394 network 302 that operates in accordance with the IEEE1394 standard. Home gateway 301 can also exchange data and is connected with program selection terminal 305 and personal computer 306 via IEEE802.1 network 304 that operates in accordance with the IEEE802.1 standard. Further, home gateway 301 can exchange data with PDA 308 via wireless LAN 307. However, the protocol for data exchange in the home network is not limited to the above. Program selection terminal 305 obtains an EPG by accessing the program guide server 102 using an installed browser function, informs home gateway 301 about the multicast address of the selected program, when the user selects a desired program, and requests home gateway 301 for a setting that is capable of receiving the program. While PDA 308 has the same function as program selection terminal 305, PDA 308 has an interface with home gateway 301 with a wireless connection. It is not necessary to have both program selection terminal 305 and PDA 308 at the same time, thus, the following illustration only uses program selection terminal 305.

Hereafter, an operation of the video image distribution system according to the embodiment with the above-described configuration is illustrated.

Figure 2:
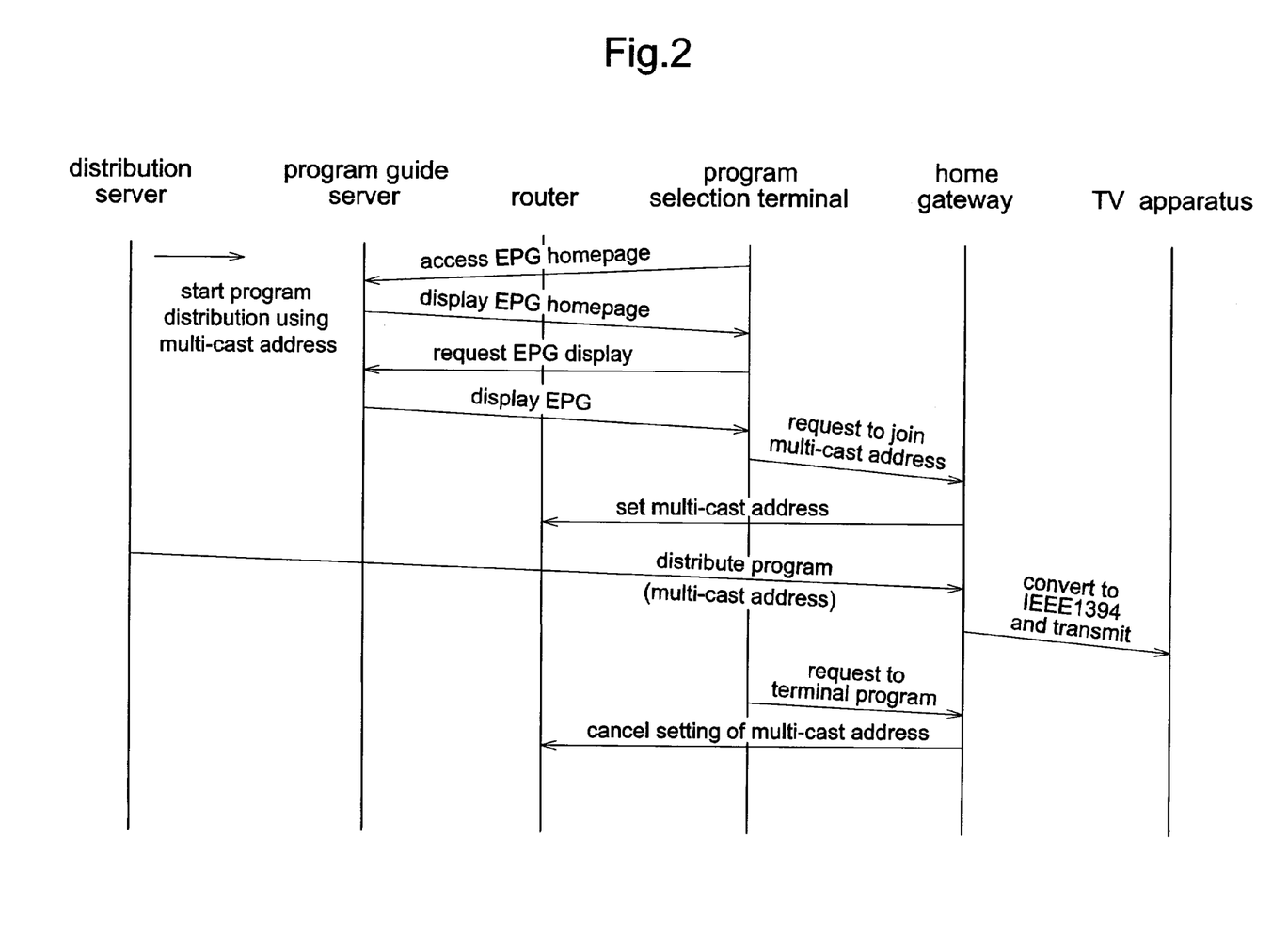
FIG. 2 is a sequence chart according to the embodiment.
Figure 3:
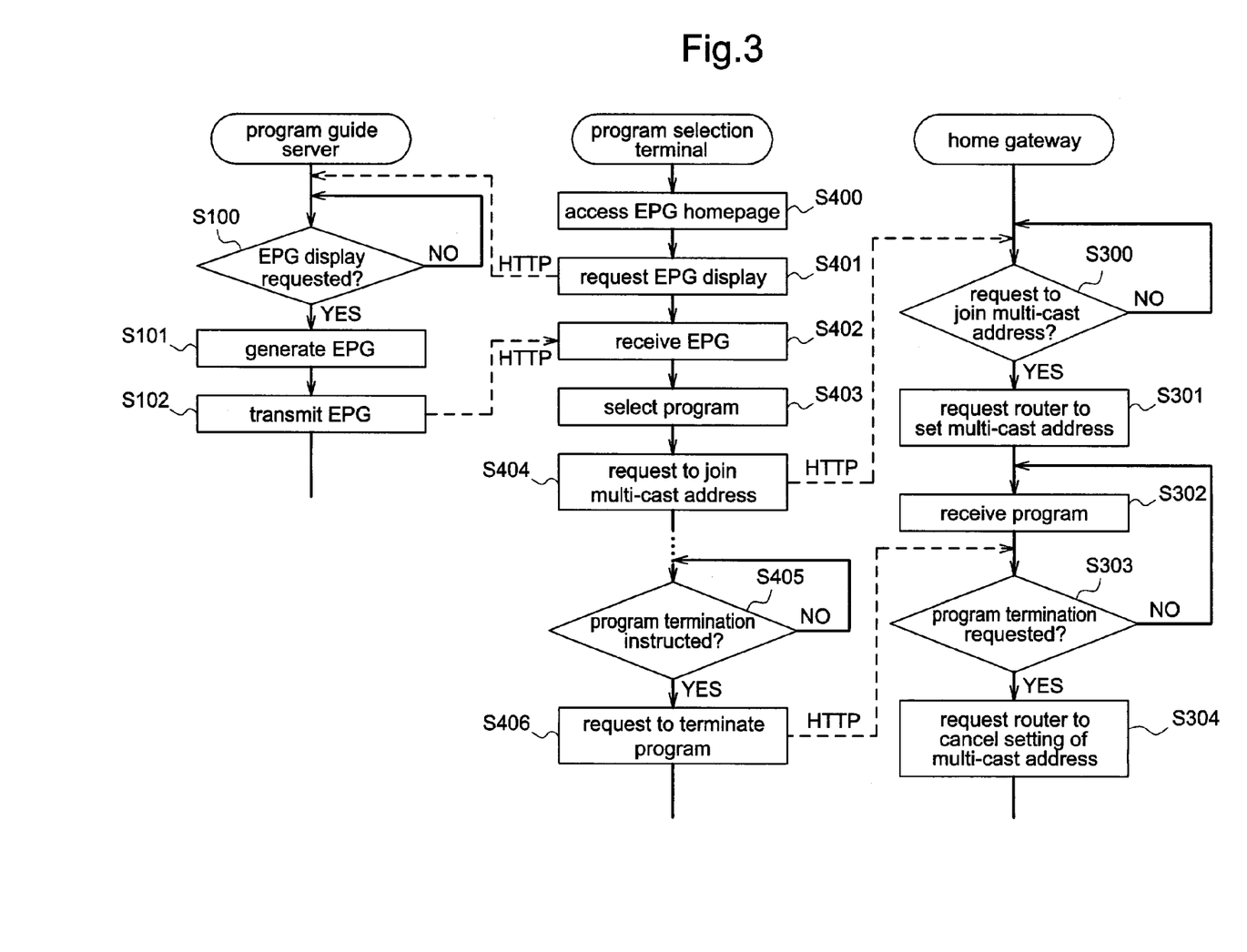
FIG. 3 is a flowchart illustrating a program guide server, program selection terminal, and home gateway.

FIG. 2 is a sequence chart illustrating an operation of setting/canceling a multicast address of a desired program according to the embodiment. FIG. 3 is a flowchart illustrating a process in each apparatus in relation to the sequence chart in FIG. 2.

When a user wishes to receive a desired program distribution at SOHO/home 300, the user operates program selection terminal 305 and accesses an EPG homepage provided by program guide server 102 (step S400). For example, the user accesses the EPG homepage by inputting an URL of the EPG homepage, which is provided by program guide server 102, using the browser function of program selection terminal 305. The URL of the EPG homepage can be preprogrammed in program selection terminal 305, having a button that accesses the EPG homepage in the browser's start-up screen, so that, when the button is clicked, the browser can recognizes the preprogrammed URL and automatically requests the EPG homepage.

The browser operating on the program selection terminal 305 uses "cookie" information when initially accessing program guide server 102, in order to transmit the IP address of home gateway 301. In this embodiment, the IP address of the home gateway 301 set in SOHO/home 300 is preprogrammed in program selection terminal 305.

However, the system of informing the program guide server 102 about the IP address of home gateway 301 is not limited to the method of using a "cookie", as long as the program guide server 102 can recognize the IP address with any method, until program guide server 102 generates an EPG that matches with program selection terminal 305. The same applies to requesting a program-at-a-glance using later-described keyword/genre searches.

Program guide server 102 operates as an HTTP server and can detect a request coming from the outside. When it is determined that the request received from the outside is an access request to an EPG homepage, program guide server 102 allows the requester to display the EPG homepage screen using the HTTP.

Figure 4:
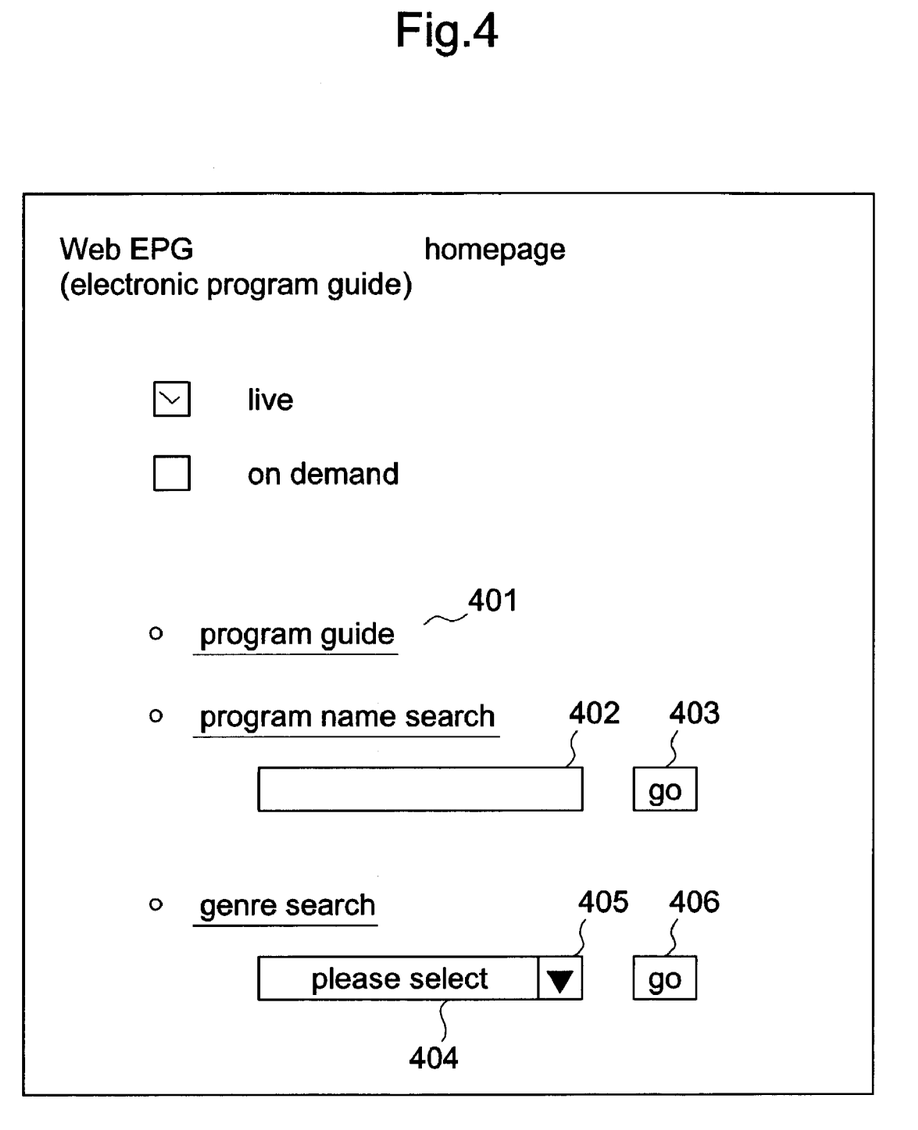
FIG. 4 illustrates an exemplary display of an EPG homepage screen provided by the program guide server.

FIG. 4 illustrates an exemplary display of the EPG homepage screen. When "program guide" 401 is selected, it is programmed to transmit an EPG display request to program guide server 102. A program name can be searched by a keyword; therefore, when a desired keyword is input in searching keyword input box 402 and select button 403 is selected, program-at-a-glance (HTML file) from the search result based on the input keyword is requested from program guide server 102. Genre search is also available; therefore, when a searching genre is input in searching genre input box 404 and select button 406 is selected, program-at-a-glance (HTML file) form the search result based on the genre is requested from program guide server 102. Searchable genre is prearranged, and the desired genre can be input in the searching genre input box 404 by using scroll button 405.

When a user selects "program guide" 401 on the EPG homepage screen, which is displayed on program selection terminal 305, program selection terminal 305 transmits an EPG display request to program guide server 102 (step S401).

When program guide server 102 determines that the EPG display request is received (step S100), an EPG that matches with program selection terminal 305 (requester) is generated in HTML (step S101).

Figure 5:
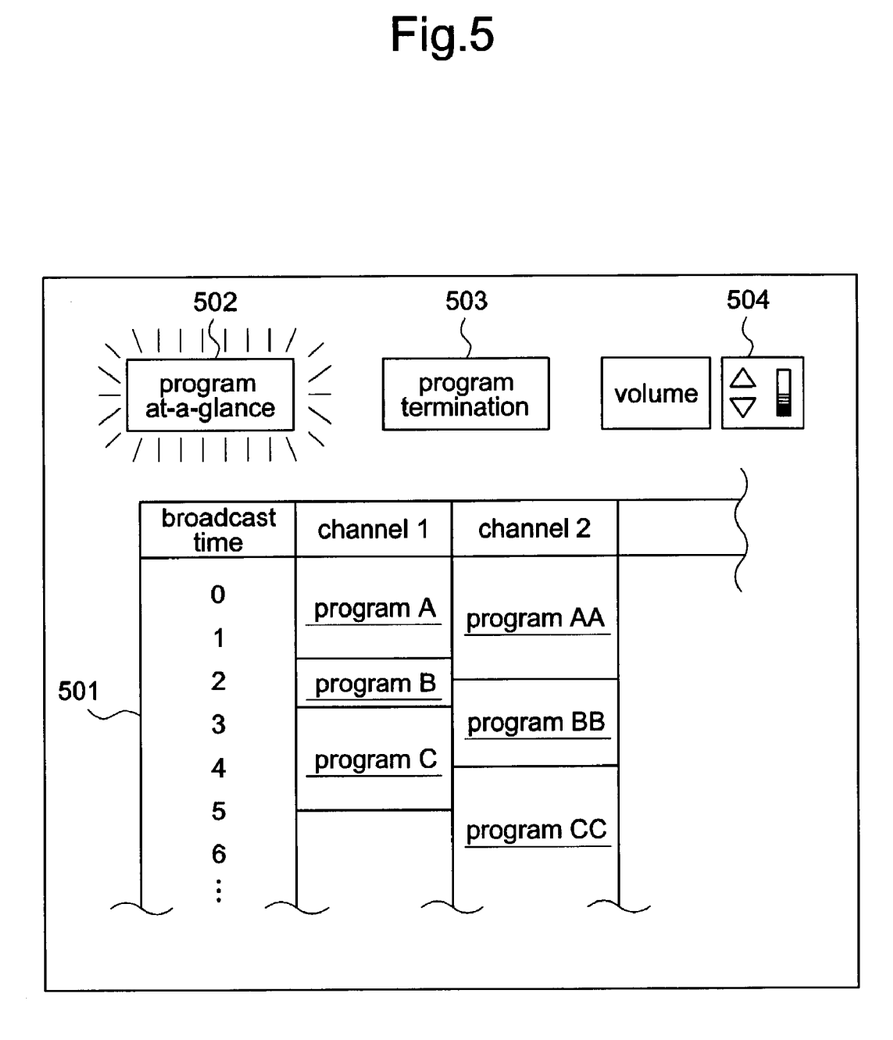
FIG. 5 illustrates an exemplary display of the EPG provided by the program guide server.

The EPG generated at step S101 is illustrated in detail below. FIG. 5 is an example of the EPG display. Table 501 is displayed that associates broadcasting time periods with program names (A, B, C, AA, BB, CC, etc.) for each channel. In addition, program-at-a-glance button 502 that displays Table 501, program termination button 503 that instructs a termination of a selected program, and a volume button 504 that adjusts the volume of selected program are provided on top of table 501.

Figure 6:
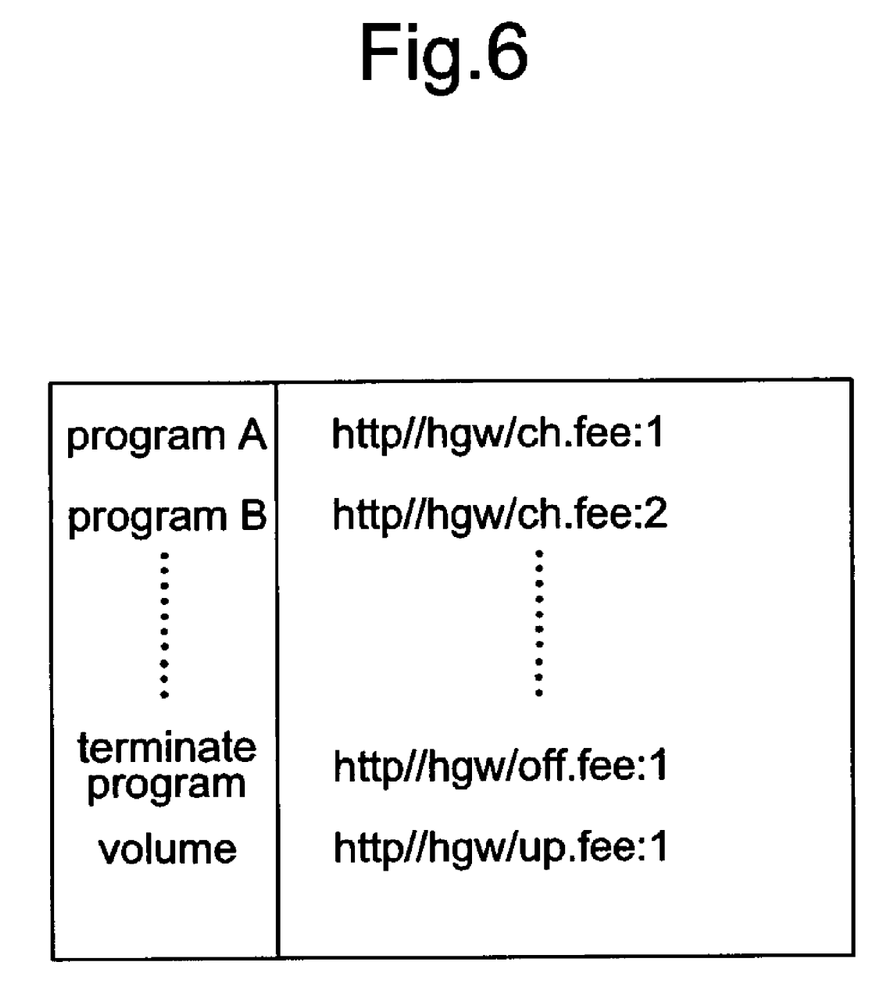
FIG. 6 illustrates a relationship between an individual program displayed on the EPG and a source code embedded in the program display location.

As shown in FIG. 6, a source code (HTML source) of a separate page is embedded in each program (A, B, C, . . . ) listed in table 501. For example, a source code "http//hgw/ch.fee:1" is embedded in "program A". "hgw" is an IP address of home gateway 301 inserted in the script of the EPG display request, which is generated at step S401. "ch" is a command that is recognized and executed by home gateway 301, stating "set the character string (fee:1) after the command (ch) as a multicast address". Accordingly, when the multicast address is set in router 200r1, it is possible to receive the distribution of program A. "fee:1" is a multicast address for distributing "program A". Such a source code is set in every program.

Therefore program selection terminal 305 can obtain a multicast address that distributes each program, and receive the program distribution, using the multicast address. It is because EGP in which the multicast address is written, is generated to each program displayed on table 501, and is transmitted from program guide server 102 to program selection terminal 305.

Moreover, a source code "http//hgw/off/fee:1" is embedded in program termination button 503. "off" is a command that is recognized and executed by home gateway 301, stating "cancel the multicast address setting made from character string (fee:1) after the command (off)". Therefore, when the multicast address setting is canceled from router 200r1, it is possible to stop the distribution of program A. When program termination button 503 is selected, the multicast address of the currently selected program is set to a source cord for program termination button 503 as a multicast address to cancel the setting. Or when the setting of the multicast address is requested after a program is selected, the multicast address can be automatically set as a source cord for program termination button 503.

A source code "http//hgw/up.fee:1" is embedded in an up mark of volume button 504. "up" is a command that is recognized and executed by home gateway 301, stating "raise the volume of video images distributed by a multicast address made from character string (fee:1) after the command (up)". Source code "http//hgw/down.fee:1" states lowering of the volume, which is opposite from the up mark of volume button 504.

Figure 7:
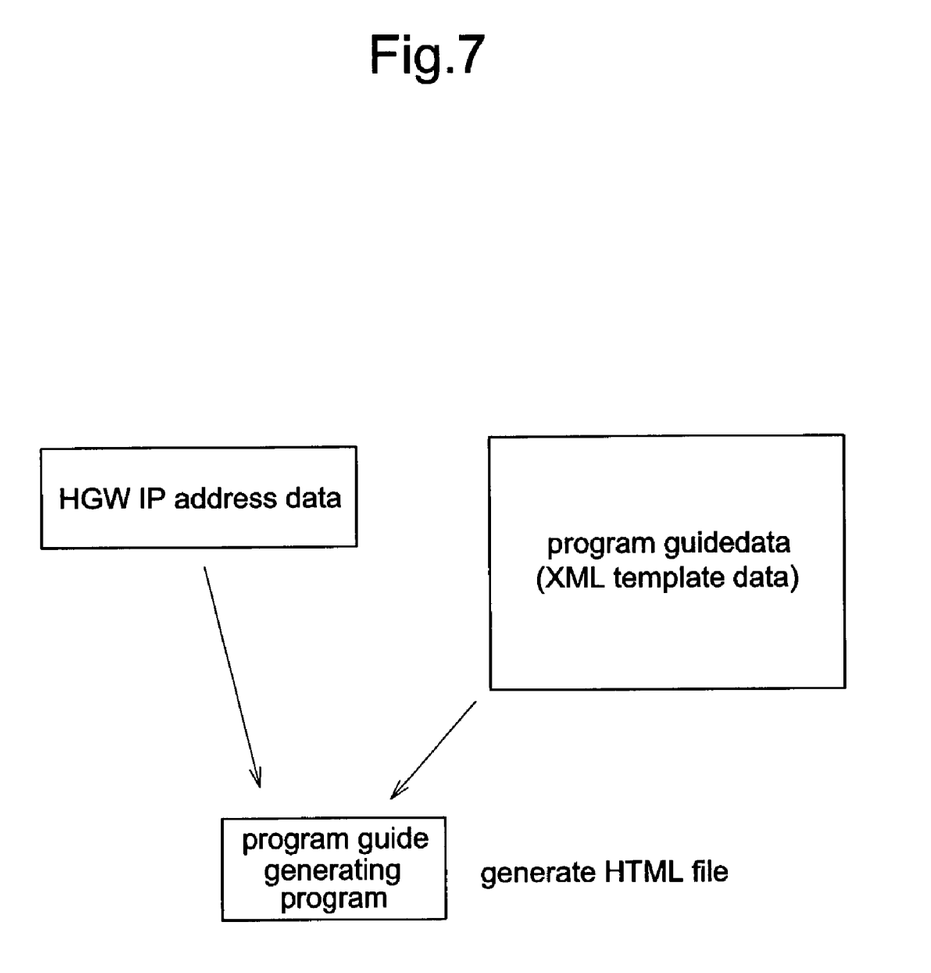
FIG. 7 is a schematic illustration of an EPG generation process at the program guide server.

FIG. 7 is a schematic illustration of combining the IP address of the home gateway and program guide data. The EPG of FIG. 5 is displayed by program guide generation program (HTML file).

Program-at-a-glance extracted from keyword/genre search also generates an EPG.

Accordingly, an EPG that includes multicast addresses of each program is generated and transmitted to program selection terminal 305 (requester) (step S102). When an EPG is received form program guide server 102 (step S402), program selection terminal 305 displays the EPG shown in FIG. 5. The user then selects and clicks the desired program that is being distributed from table 501 (step S403).

The following illustration is provided as "program A" is selected within table 501. Based on the source code "http//hgw/ch.fee:1" embedded in association with "program A", program selection terminal 305 accesses home gateway 301, which is addressed with "hgw" with the HTTP, and delivers multicast address "fee:1" (which distributes selected program A) to the HTTP server of home gateway 301 along with the command "ch" (step S404). By delivering the command "ch" and multicast address "fee:1" to home gateway 301, a participation in multicast address "fee:1" is requested.

The HTTP server of home gateway 301 analyzes data transmitted as HTTP from outside. When the command "ch" is detected, the server recognizes that it is requesting to participate in the multicast address (step S300). Home gateway 301 executes the command "ch", using a predetermined protocol (e.g., IGMP) toward upper layer router 200r1, to request a setup of the multicast address (fee:1). Router 200r1 exchanges multicast address information with surrounding routers (including the upper layer router), so that data that sets the multicast address (fee:1) will be forwarded to router 200r1.

As a result, distribution server 101 setups the multicast address (fee:1) assigned to the broadcasting program (program A) and distributes the program data to Internet 200. The program data is then distributed to home gateway 301 via router 200r1, so that "program A" is received (step S302). The process in which home gateway 301 receives the program data and displays the same on TV apparatus 303 is later described.

In order to terminate the receiving program with the multicast setting, the user operates program selection terminal 305 and cancels the multicast address. The user clicks program termination button 503 of the EPG displayed on program selection terminal 305, shown in FIG. 5. In this embodiment, the screen that is used to select program A at step S403 is kept to be displayed as the initial screen when the browser function is initiated. When it is detected that program termination button 503 is clicked, program selection terminal 305 recognizes an instruction for terminating the program (step S405). Then, according to the source code "http//hgw/off.fee:1" embedded in association with program termination button 503, program termination request is generated (step S406). In particular, program selection terminal 305 transmits the command "off" and target multicast address "fee:1" to the HTTP server of home gateway 301.

When the HTTP server of home gateway 301 receives the program termination request from program selection terminal 305 (step S303), the HTTP server executes command "off" and cancels the multicast address setting (step S304). Particularly, the HTTP server executes the command "off", using a predetermined protocol (e.g., IGMP) toward the upper layer router 200r1, to request the cancellation of the multicast address (fee:1) setting (step S304). Upper layer router 200r1 exchanges the table, in which the multicast address (fee:1) setting is canceled, with surrounding routers. Accordingly, the program data (program A) of the multicast address (fee:1) will no longer be forwarded to home gateway 301 from upper layer router 200r1, which terminates the program distribution.

Accordingly, by requesting an EPG display from program selection terminal 305 to program guide 102, it is possible to retrieve the EPG, which describes the multicast address for distributing each program, into program selection terminal 305. Also, by selecting a desired program using the EPG, it is possible to set the program distributing multicast address in router 200r1 and receive the program distribution. In order to stop the program distribution selected by the EPG, it is possible to cancel the multicast address of the program set in router 200r1, by clicking the program termination button 503 of the EPG. Accordingly, it is possible to simplify the process of obtaining/setting/canceling of multicast address relating to a program.

The following illustrates a process in relation to displaying programs at home gateway 301.

Figure 8:
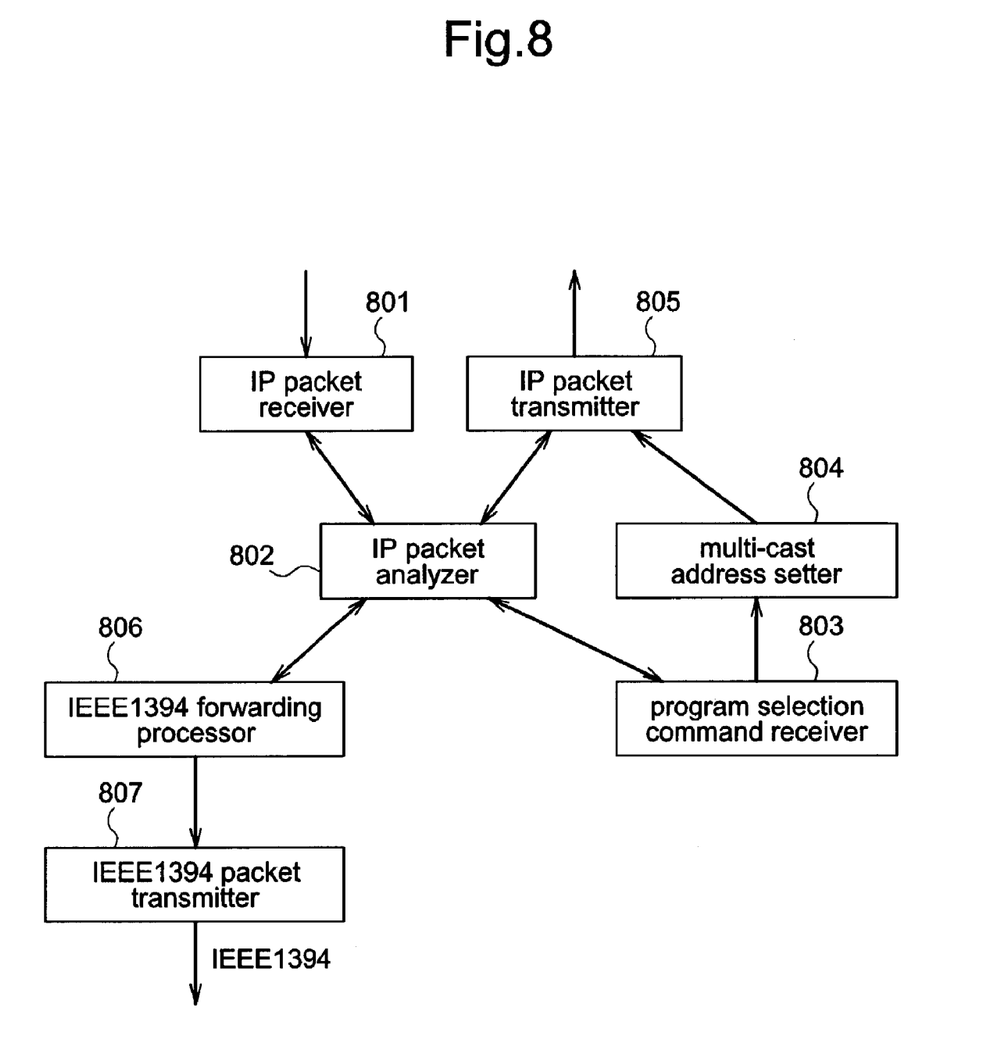
FIG. 8 is a functional block diagram of the home gateway.
Figure 9:
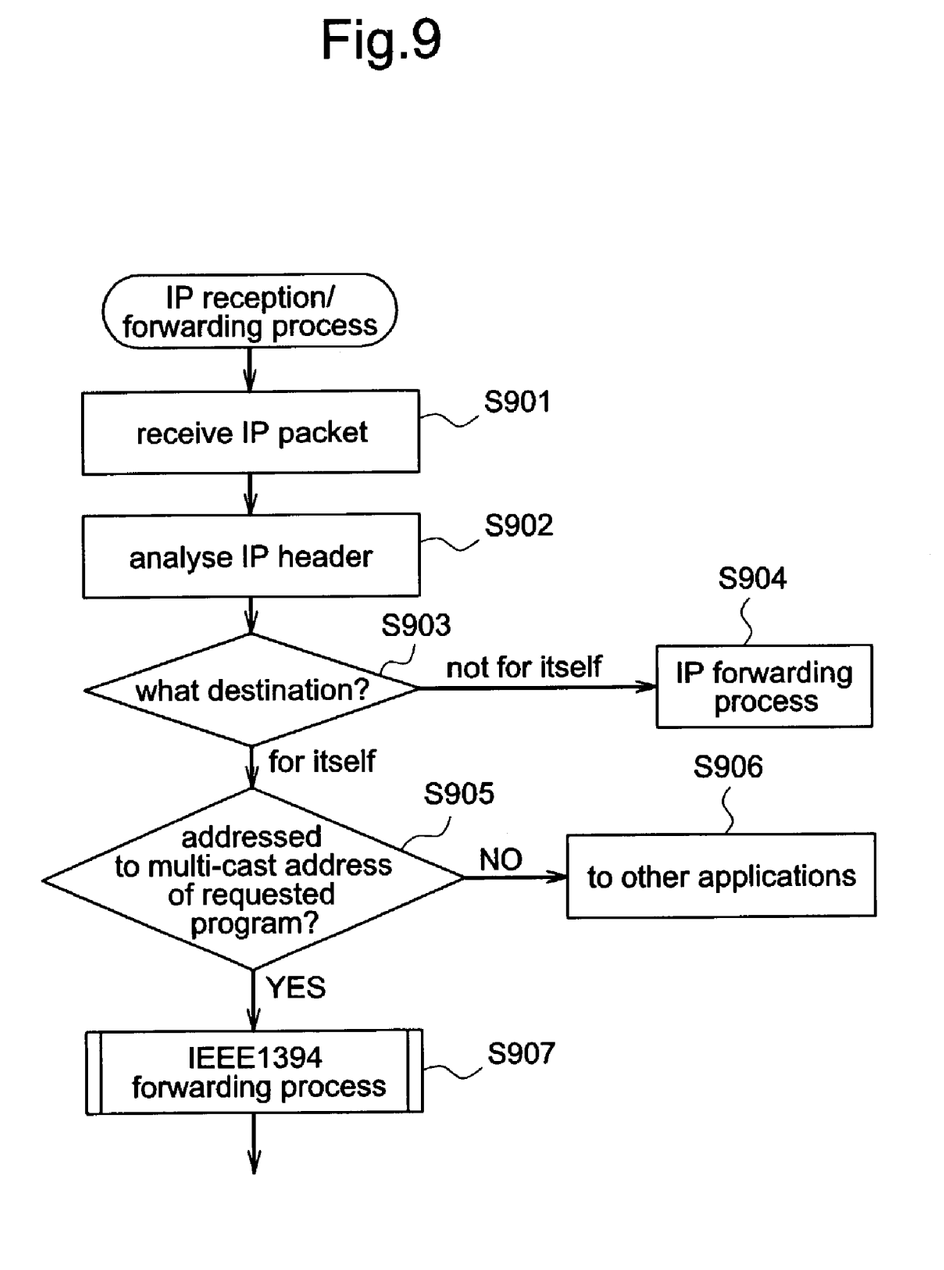
FIG. 9 is a flowchart illustrating an IP reception/forwarding process at the home gateway.
Figure 10:
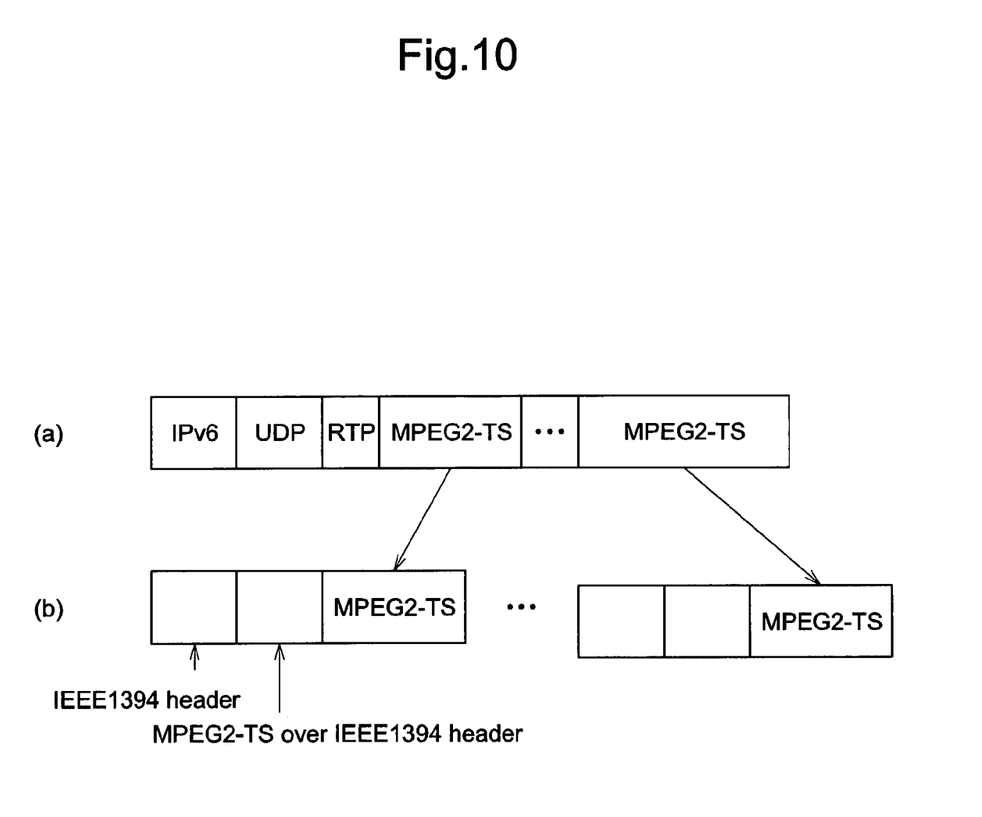

FIG. 8 is a functional block diagram in relation to an IP packet process and IEEE1394 forwarding process at home gateway 301. FIG. 9 is a flowchart illustrating a case where home gateway 301 receives an IP packet. When IP packet receiver 801 receives an IP packet from Internet 200 (or IEEE802.1 network) (step S901), IP packet analyzer 802 analyzes an IP header of the IP packet (step S902). As shown in FIG. 10, the IP header includes an IP address, UDP, and RTP. IP packet analyzer 802 checks the destination of the IP address to determine whether the IP address is intended to itself (step S903).

For example, if the IP address of program selection terminal 305 is intended destination address, the received IP packet is output to program selection terminal 305 via IEEE802.1 network. If the IP address is intended to itself, as explained later, the IP address is output to itself (home gateway 301).

When the destination address is home gateway 301 itself (hgw), or a participating multicast address, IP packet analyzer 802 retrieves the IP packet (step S905).

When the destination address is home gateway 301 itself (hgw), IP packet analyzer 802 delivers to a corresponding application from the port number set in the UDP (step S906). For example, when the IP packet relates to the program selection command that sets a multicast address, program selection command receiver 803 detects a command "ch" that relates to the program selection. Then, multicast address setter 804 executes command "ch", generates data requesting a participation in the multicast address toward router 200r1, and transmits the data converted in to an IP packet from IP packet transmitter 805.

When the multicast address is already set, program data is distributed by making the multicast address as a destination address. When the destination address is a participating multicast address, IP packet analyzer 802 delivers the packet data by deleting its IP address and UDP from the IP header, to IEEE1394 forwarding processor 806.

As shown in FIGS. 10(a) and (b), IEEE1394 forwarding processor 806 converts the packet data that configures the program into a format that matches with the IEEE1394, and forwards the data to TV apparatus 303 (step S907).

Figure 11:
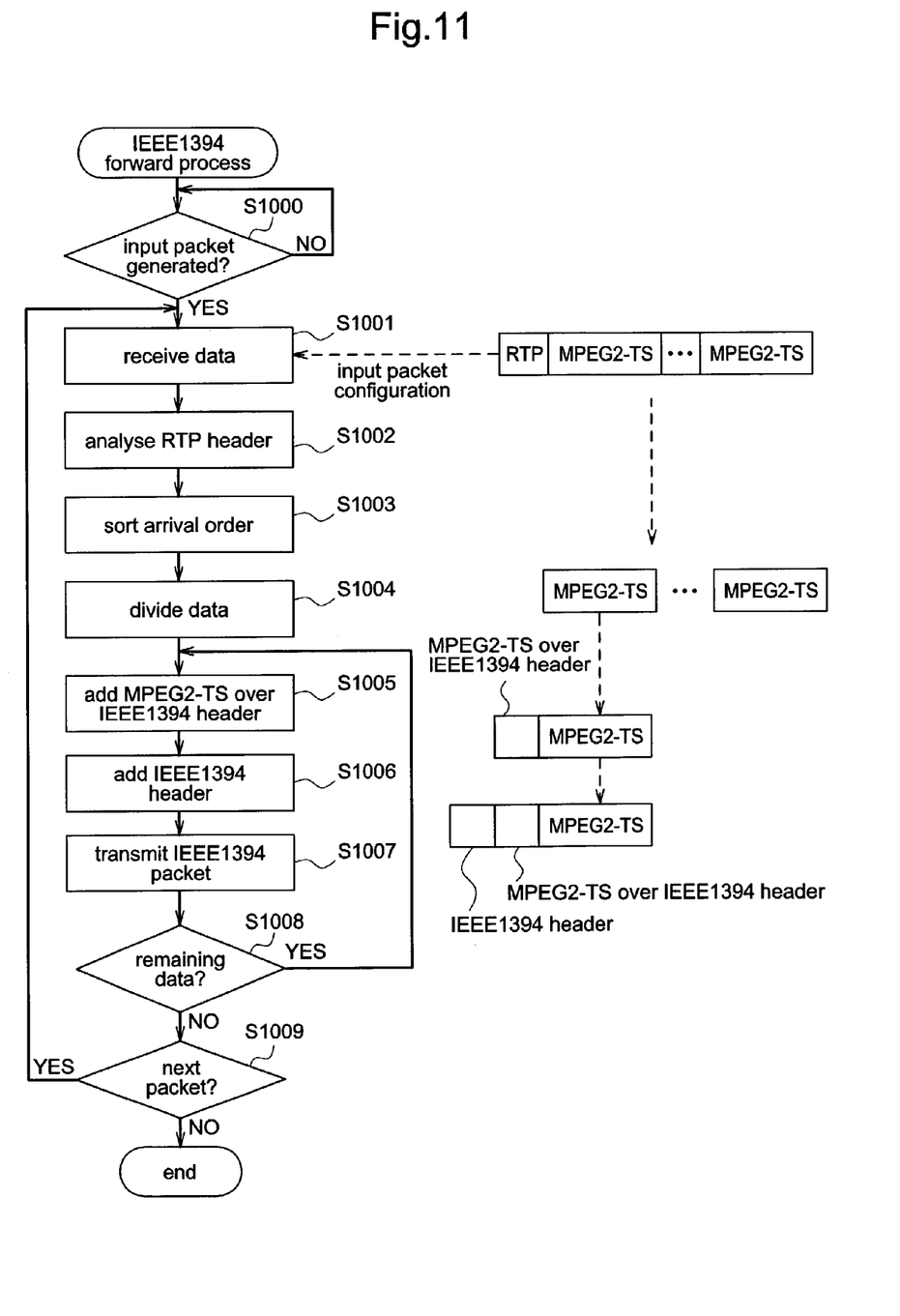
FIG. 11 is a flowchart related to IEEE1394 forwarding at the home gateway.

FIG. 11 is a flowchart illustrating IEEE1394 forwarding processor 806. When an input packet is generated (step S1000), the input packet is retrieved (step S1001), and the RTP that is attached to the packet header is analyzed (step S1002). Since the RTP has a packet order number that configures the currently distributed program, the packet arrival order is sorted based on the order number (step S1003). Data unit of a packet (MPEG2-TS) is divided at a predetermined size (step S1004), MPEG2-TS over IEEE1394 header is added to the divided data of each program (MPEG2-TS) (step S1005), and IEEE1394 header is further added to the same (step S1006). Accordingly, generated IEEE1394 packet is transmitted to IEEE1394 network 302 (step S1007). Then, it is checked whether there is remaining divided program data (MPEG2-TS) (step S1008). When there is no such data, it is checked whether there is a next packet (step S1009). When there is no next packet, the process is terminated. In addition, TV apparatus 303 has an IEEE1394 interface. Thus, a packet retrieved from network 302 is assembled, and MPEG2-TS is decoded and converted into an NTSC signal by a decoder, in order to display the data on a screen and output voice data at the same time.

As described above, when home gateway 301 receives an IP packet distributed using a multicast address, the IP packet is converted into an IEEE1394 packet and transmitted to IEEE1394 network 302, so that the screen of TV apparatus 303 can display the program.

The above illustration uses a case where broadcasting contents are distributed. However, it is possible to similarly distribute contents other than broadcasting contents, using multicast method.

Additionally, in the above described embodiment, both home gateway 301 and TV apparatus 303 use the IEEE1394 interface. However, it is possible to have a setting where home gateway 301 plays video image signals from the IP packet, converts the signals into NTSC signals, and outputs the same to an NTSC terminal of TV apparatus 303. Moreover, an NTSC signal is an example of composite signals, thus other signals of different formats can be applied.

In the above-described embodiment, a desired program is viewed on TV apparatus 303; however, it can be viewed on program selection terminal 305. Further, program selection terminal 305 can be included in TV apparatus 303 in its configuration.

In the above-described embodiment, multicast distribution is used as an example; however, this invention can also be applied to unicast distribution. When using a unicast distribution, it is not necessary to insert a multicast address into an EPG, which is generated by program guide server 102. Rather, program identification information is inserted instead of a multicast address, and a command requesting the distribution of a desired program in unicast is inserted, instead of a command "ch". When a program is selected from the EPG, the HTTP server of home gateway 301 detects the command and executes the same. Accordingly, home gateway 301 delivers the identification information of the desired program to data center/broadcast station 100, in order to request the distribution in unicast. In addition, this invention can be applied to other distribution methods that are not described above.

In the above-described embodiment, when an EPG is generated in the HTML and a desired program is selected, an embedded source code in relation to the desired program is executed to access to home gateway 301 and request a distribution of the desired program. However, the program guide does not have to have an XML format, as long as the system installs an application that automatically accesses home gateway 301 and requests a distribution of the desired program.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2001-367680 filed on Nov. 30, 2001, entire content of which is expressly incorporated by reference herein.

What is claimed is:

1. An information distribution system, comprising:
   a distribution server that is connected with a network, stores contents data and distributes the contents data to the network;
   a program guide server that is connected with the network, receives a request for program guide information, and generates the program guide information, the program guide information comprising information data of a plurality of programs, the information data including a title of the program, an IP address included in the request, a multicast address of the contents data, and a command data;
   a router that is connected with the distribution server and the program guide server via the network;
   a gateway that is connected with the router outside of a home and connected with a home network at the home, receives the contents data from the distribution server via the router, receives the program guide information from the program guide server via the router, and sends the contents data and the program guide information to the home network;
   a program selection terminal that is connected with the gateway on the home network, sends the request including the IP address of the gateway to the program guide server wherein the program guide server generates the program guide information and sends the program guide information to the program selection terminal via the gateway according to the IP address of the gateway, receives the program guide information from the program guide server via the gateway, selects the information data of one of the plurality of programs from the program guide information and sends the selected information data to the gateway in accordance with the IP address wherein the gateway sets a multicast address to the router in accordance with the command data included in the selected information data and the distribution server distributes the contents data in accordance with the multicast address; and a data receiving and display apparatus that is connected with the gateway on the home network and that is configured to receive the contents data from the distribution server via the gateway and to display the received contents data, the contents data being transmitted from the router to the data receiving and display apparatus via the gateway, wherein the program guide server generates the program guide information in response to receiving the request from the program selection terminal by embedding, in each program included in the program guide information, the title of the program, the IP address of the gateway included in the request, the multicast address of the contents data, and the command data.

2. The information distribution system according to claim 1, wherein the IP address, the multicast address, and the command data are described in the form of HTML.

3. The information distribution system according to claim 1, the program guide information further including source code of command data that is recognized and executed by the gateway to cancel a multicast address setting.

4. The information distribution system according to claim 1, the program guide information further including source code of command data that is recognized and executed by the gateway to adjust the volume of contents data distributed by the multicast address setting.

5. An information distribution method for a system including a distribution server that stores contents data and that is connected with a network, a program guide server that generates program guide information, the program guide information comprising information data of a plurality of programs, a router that is connected with the distribution server and with the program guide server via the network, a gateway that is connected with the router, a program selection terminal that is connected with the gateway and a data receiving and display apparatus that is connected with the gateway, the information distribution method comprising:

sending, from the program selection terminal, a request including an IP address of the gateway to the program guide server to receive the program guide information from the program guide server via the gateway;

generating, by the program guide server, the program guide information comprising information data of a plurality of programs, the information data including a title of the program, an IP address of the gateway, a multicast address of the contents data, and a command data;

sending, from the program guide server, the program guide information to the program selection terminal via the gateway according to the IP address of the gateway in response to the sending of the request to receive the program guide information;

receiving, by the gateway, the program guide information from the program guide server via the router;

selecting, by the program selection terminal, information data of one of the plurality of programs from the program guide information;

sending the selected program information to the gateway in accordance with the IP address;

setting, by the gateway, a multicast address to the router in accordance with the command data included in the selected information data;

distributing, by the distribution server, the contents data according to the multicast address;

receiving, by the gateway, the contents data from the distribution server via the router;

receiving, by the data receiving and display apparatus, the contents data from the gateway; and displaying, by the data receiving and display apparatus, the received contents data, wherein the program guide information is generated by the program guide server in response to receiving the request from the program selection terminal by embedding, in each program included in the program guide information, the title of the program, the IP address of the gateway included in the request, the multicast address of the contents data, and the command data.

6. The information distribution method according to claim 5, further comprising describing the IP address, the multicast address and the command data in the form of HTML.

7. The information distribution method according to claim 5, the program guide information further including source code of command data that is recognized and executed by the gateway to cancel a multicast address setting.

8. The information distribution method according to claim 5, the program guide information further including source code of command data that is recognized and executed by the gateway to adjust the volume of contents data distributed by a the multicast address setting.

* * * * *

UNITED STATES PATENT AND TRADEMARK OFFICE
CERTIFICATE OF CORRECTION

PATENT NO.       : 7,636,932 B2                                                Page 1 of 1
APPLICATION NO.  : 10/270605
DATED            : December 22, 2009
INVENTOR(S)      : Junichi Sakai It is certified that error appears in the above-identified patent and that said Letters Patent is hereby corrected as shown below:

On the Title Page, at Item (73), Assignee, "Panasonic Corporation, Osaka (JP)" should be
-- Panasonic Communications Co., Ltd., Fukuoka (JP) --

Signed and Sealed this

Twenty-third Day of March, 2010

David J. Kappos
*Director of the United States Patent and Trademark Office*